(12) United States Patent
Ohara et al.

(10) Patent No.: US 8,191,934 B1
(45) Date of Patent: Jun. 5, 2012

(54) CONNECTION STRUCTURE BETWEEN THIN WALL STAINLESS STEEL PIPE AND JOINT

(75) Inventors: Koji Ohara, Okayama (JP); Hiroshi Ashida, Okayama (JP)

(73) Assignee: O.N. Industries, Ltd. (JP)

( * ) Notice: Subject to any disclaimer, the term of this patent is extended or adjusted under 35 U.S.C. 154(b) by 0 days.

(21) Appl. No.: 12/956,140

(22) Filed: Nov. 30, 2010

(51) Int. Cl.
*F16L 21/02* (2006.01)
(52) U.S. Cl. ......... 285/368; 285/18; 285/105; 285/342; 285/412
(58) Field of Classification Search ............ 285/368, 285/412, 18, 23, 104–105, 108, 113, 191, 285/342
See application file for complete search history.

(56) References Cited

U.S. PATENT DOCUMENTS

| | | | | |
|---|---|---|---|---|
| 769,131 A * | 8/1904 | Dillenburg | ............ | 277/621 |
| 1,078,009 A * | 11/1913 | Taylor | ............ | 285/332.2 |
| 1,098,974 A * | 6/1914 | Reilly | ............ | 277/608 |
| 1,314,410 A * | 8/1919 | McCulloch | ............ | 285/233 |
| 1,423,754 A * | 7/1922 | Clark | ............ | 285/413 |
| 1,563,161 A * | 11/1925 | Christenson | ............ | 285/111 |
| 1,709,837 A * | 4/1929 | Bulmahn | ............ | 285/231 |
| 1,715,436 A * | 6/1929 | Hall | ............ | 285/342 |
| 1,741,975 A * | 12/1929 | Burnham | ............ | 285/271 |
| 1,873,620 A * | 8/1932 | Moore | ............ | 277/620 |
| 1,951,034 A * | 3/1934 | Norton | ............ | 285/413 |
| 2,289,696 A * | 7/1942 | Cailloux | ............ | 285/3 |

* cited by examiner

*Primary Examiner* — Aaron Dunwoody
*Assistant Examiner* — Fannie Kee
(74) *Attorney, Agent, or Firm* — Thomas, Kayden, Horstemeyer & Risley, LLP.

(57) ABSTRACT

A connection structure includes a thin wall stainless steel pipe with a swelling portion, a sandwiching portion forming an inclined pressing surface capable of pressing an inclined surface of the swelling portion, a joint spacer forming a first retention portion pinching a first gasket with respect to the swelling portion as well as having a fitting portion fitted to an outer periphery of an end portion of the thin wall stainless steel pipe, and forming a gasket receiving portion in an outer peripheral side thereof, and a joint having a second retention portion sandwiching and pressing a second gasket to an inner peripheral side facing the gasket receiving portion.

3 Claims, 7 Drawing Sheets

(a)

(b)

(c)

CONNECTION STRUCTURE BETWEEN THIN WALL STAINLESS STEEL PIPE AND JOINT

BACKGROUND OF THE INVENTION (1) Field of the Invention

The present invention relates to a connection structure between a thin wall stainless steel pipe and a joint, and more particularly to a connection structure between a thin wall stainless steel pipe and a joint which can connect a joint, and a thin wall stainless steel pipe having a pipe diameter which is different from and does not comply with a pipe diameter of the joint while holding airtightness.

(2) Description of Related Art

Since the thin wall stainless steel pipe is excellent in durability or the like, it is used for various intended uses including purposes for supplying water, supplying hot water and supplying cold and hot water. This thin wall stainless steel pipes having the various pipe diameters are prepared so as to be selectable depending on the intended use or the like. However, there is a case where it is necessary to connect the thin wall stainless steel pipes having the different pipe diameters by using the joint.

Taking the above circumstance into consideration, Japanese Unexamined Patent Publication No. 2006-336697 (JP-A-2006-336697) discloses a joint for connecting pipe bodies such as two thin wall stainless steel pipes or the like having different pipe diameters from each other.

This joint is a linear joint, is structured such that one end complies with a pipe diameter of one pipe body, and is manufactured such that the other end complies with a pipe diameter of the other pipe body. Accordingly, the joint disclosed in the JP-A-2006-336697 can connect two pipe bodies having the different pipe diameters from each other.

However, in the joint disclosed in JP-A-2006-336697, it is necessary to form the end portions in such a manner as to comply with the pipe diameters of the pipe body. As mentioned above, since the thin wall stainless steel pipes having the various pipe diameters are prepared, it is necessary to prepare many kinds of joints that correspond thereto, by using the joint disclosed in JP-A-2006-336697. This matter is a great burden to both a manufacturer supplying the joint, and a consumer using the joint, in view of a manufacturing cost, a storage space or the like.

The present invention is made in view of the above-mentioned problem, and an object of the present invention is to provide a connection structure between a thin wall stainless steel pipe and a joint which can connect the thin wall stainless steels having different pipe diameters from each other by using a general purpose joint, since it can connect the joint and the thin wall stainless steel pipe having the pipe diameter which does not comply with the joint while holding airtightness.

SUMMARY OF THE INVENTION

In order to achieve the above object, according to a first aspect of the present invention, there is provided a connection structure between a thin wall stainless steel pipe and a joint, including: a thin wall stainless steel pipe in which a swelling portion having two inclined surfaces is formed in an outer periphery of an end portion; a sandwiching portion having a protruding portion protruding to an inner peripheral side of an inner end surface as well as forming an inclined pressing surface capable of pressing one inclined surface of the swelling portion of the thin wall stainless steel pipe to an end portion side in an inner peripheral side, having a flange portion in an outer peripheral side and externally fitted to the thin wall stainless steel pipe; a joint spacer forming a first retention portion pinching a first gasket and the protruding portion with respect to the swelling portion in an inner peripheral side facing the other inclined surface of the swelling portion as well as having a fitting portion forming a fitting inner peripheral surface fitted to an outer periphery of the end portion of the thin wall stainless steel pipe and having a predetermined thickness, forming a gasket receiving portion in an outer peripheral side provided with the first retention portion, and further provided with a contact surface coming into contact with an inner end surface of the sandwiching portion; a joint having a second retention portion sandwiching and pressing a second gasket to an inner peripheral side facing the gasket receiving portion as well as fitting to an outer periphery of the fitting portion of the joint spacer and having a fitting inner peripheral surface engaging with an end portion of the fitting portion, further having a contact surface coming into contact with an inner end surface of the sandwiching portion and a leading end inner peripheral surface coming into contact with a leading end outer peripheral surface of the joint spacer in a leading end close to the sandwiching portion, and further provided with a flange portion opposed to the flange portion of the sandwiching portion in an outer peripheral side thereof; and a bolt fastening and coupling the flange portion of the sandwiching portion and the flange portion of the joint.

Further, according to a second aspect of the present invention, in the connection structure between a thin wall stainless steel pipe and a joint, the flange portion of the joint is constructed by a front flange portion having a bolt insertion hole at the center close to the sandwiching portion, and a rear flange portion having a bolt insertion hole which is an open long hole connected from above to the center.

Further, according to a third aspect of the present invention, in the connection structure between a thin wall stainless steel pipe and a joint, a rotation preventing device of a bolt head of the bolt is provided in an end surface in a side opposite to the sandwiching portion of the rear flange portion.

Further, according to a fourth aspect of the present invention, in the connection structure between a thin wall stainless steel pipe and a joint, one or more projections or depressions are formed in a surface opposed to the sandwiching portion, in the first gasket.

Further, according to a fifth aspect of the present invention, in the connection structure between a thin wall stainless steel pipe and a joint, one or more projections or depressions are formed in a surface opposed to the sandwiching portion, in the second gasket.

The connection structure between the thin wall stainless steel pipe and the joint according to the first aspect can connect the joint, and the thin wall stainless steel pipe having the pipe diameter which is different from the pipe diameter of the joint, while having airtightness. Accordingly, the present connection structure can connect the thin wall stainless steel pipes in which the pipe diameters are different from each other, by using the general purpose joint. In the present connection structure, the joint spacer is used, and it is necessary to prepare many kinds of joint spacers depending on the pipe diameters of the thin wall stainless steel pipes. However, since the joint spacer can be manufactured inexpensively as compared with the joint, and is small in size, there is such a feature that the storage place can be made small, and the joint spacer is convenient for transporting. Accordingly, the burden of the manufacturer and the consumer can be reduced as compared with the case where many kinds of joints are prepared. Further, in the present connection structure, since the protruding portion formed in the inner peripheral side of the inner end surface of the sandwiching portion is pinched by the first retention portion formed in the joint spacer fitted to the joint, it is easy to position the sandwiching portion and the joint. This has such an effect of improving a working property at the time of connecting the thin wall stainless steel pipe and the joint. Further, since the inner end surface of the sandwiching portion comes into contact with the joint spacer and the contact surface of the joint, it is possible to prevent the first gasket and the second gasket from being broken by fastening the bolt too much.

In the connection structure between the thin wall stainless steel pipe and the joint according to the second aspect, since the flange portion of the joint is constructed by the front flange portion having the bolt insertion hole in the sandwiching portion side, and the rear flange portion having the bolt insertion hole which is the open long hole which is connected from the above to the center. With the above structure, since the present connection structure can insert the shaft portion of the bolt to the bolt insertion hole of the front flange portion by inserting the shaft portion of the bolt to the center from above the bolt insertion hole of the rear flange portion and thereafter pressing, it is possible to attach the bolt in the space which is smaller at a degree corresponding to a length of the rear flange portion.

In the connection structure between the thin wall stainless steel pipe and the joint according to the third aspect, the rotation preventing device of the bolt head is provided in the end surface in the side opposite to the sandwiching portion of the rear flange. Since the bolt is inhibited by the rotation preventing device from rotating at the time of fastening and coupling the flange portion of the joint and the flange portion of the sandwiching portion by the nut, a working property of the work with respect to the fastening and coupling is improved.

In the connection structure between the thin wall stainless steel pipe and the joint according to the fourth aspect, one or more projections or depressions are formed in a side opposed to the sandwiching portion, in the first gasket. Since the projection or the depression becomes a marker for checking the front and back of the first gasket by a visual sense or a tactile sense at the time of arranging the first gasket in the first retention portion, it is possible to prevent the front and back of the first gasket from being arranged erroneously in the first retention portion.

In the connection structure between the thin wall stainless steel pipe and the joint according to the fifth aspect, one or more projections or depressions are formed in a side opposed to the sandwiching portion, in the second gasket. Since the projection or the depression becomes a marker for checking the front and back of the second gasket by a visual sense or a tactile sense at the time of arranging the second gasket in the second retention portion, it is possible to prevent the front and back of the second gasket from being arranged erroneously in the second retention portion.

DETAILED DESCRIPTION OF PREFERRED EMBODIMENTS

Figure 1:
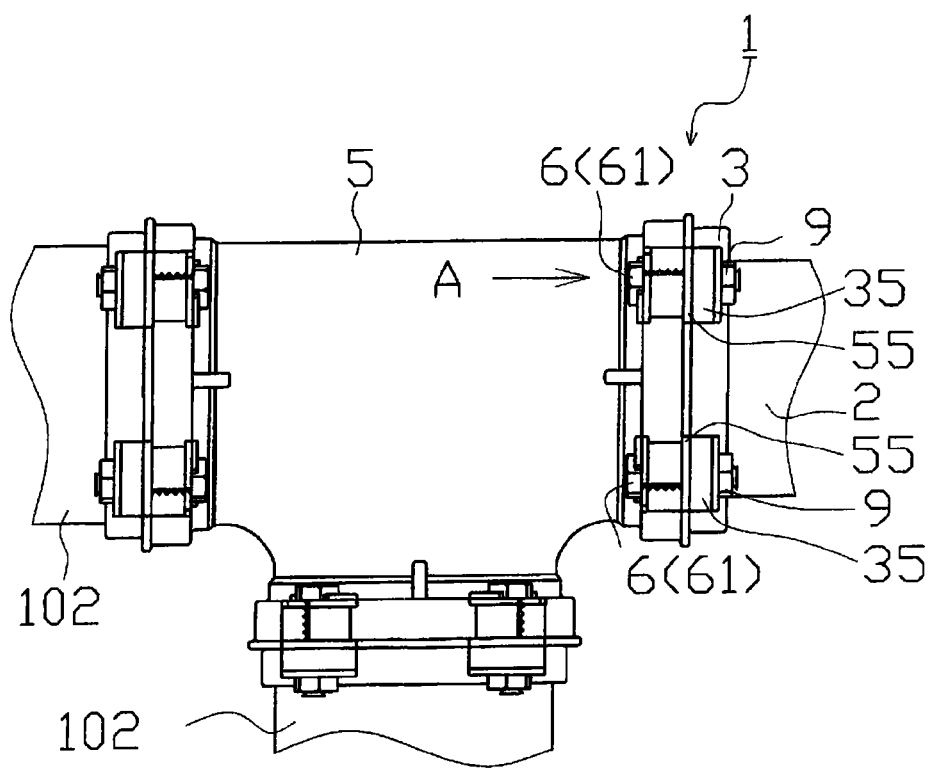
FIG. 1 is a front view showing a connection between a thin wall stainless steel pipe and a tee joint to which a connection structure according to an embodiment of the present invention is applied.

Hereinafter, an embodiment of the present invention will be described with reference to the accompanying drawings. A connection structure between a thin wall stainless steel pipe and a joint (hereinafter, simply referred to as "connection structure") 1 is mainly constructed by a thin wall stainless steel pipe 2, a sandwiching portion 3, a joint spacer 4, a joint 5 and a bolt 6. The connection structure 1 can connect the joint 5, and the thin wall stainless steel pipe 2 having a pipe diameter which does not comply with the joint 5 while holding airtightness.

Figure 2:
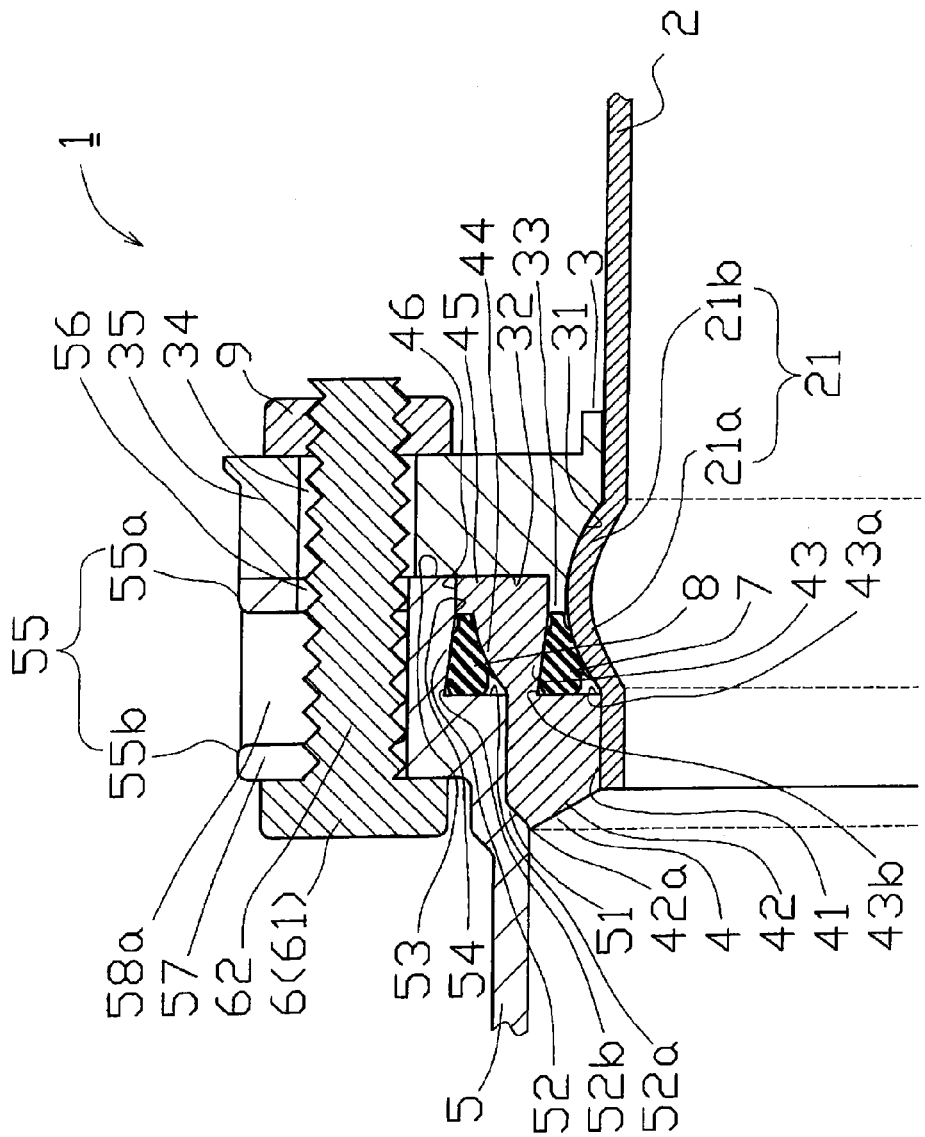
FIG. 2 is a cross sectional enlarged view of the connection structure shown in FIG. 1.

As shown in FIG. 2, the thin wall stainless steel pipe 2 is a steel pipe which is made of a stainless steel and has a pipe thickness between 0.7 mm and 3 mm, and a swelling portion 21 which is constructed by two inclined surfaces 21a and 21b and swells annularly in an outside direction is formed in an outer periphery of an end portion of the steel pipe.

The sandwiching portion 3 is externally fitted to an end portion of the thin wall stainless steel pipe 2. Further, in the sandwiching portion 3, an inclined pressing surface 31 which can press the inclined surface 21b that is one of the inclined surfaces of the swelling portion 21 of the thin wall stainless steel pipe 2 to the end portion side of the thin wall stainless steel pipe 2 is formed annularly in an inner peripheral side of the sandwiching portion 3. Further, in the sandwiching portion 3, an annular protruding portion 33 protruding to the joint 5 side is formed in an inner peripheral side of an inner end surface 32 thereof. Further, an outer peripheral side of the sandwiching portion 3 is provided with a flange portion 35 in which a bolt insertion hole 34 as a through hole is formed.

The joint spacer 4 is formed annularly, and has a fitting portion 42 which forms a fitting inner peripheral surface 41 fitted to an outer periphery closer to a leading end than the swelling portion 21 of the thin wall stainless steel pipe 2. Further, in the joint spacer 4, an annular first retention portion 43 pinching a first packing 7 and a protruding portion 33 of the sandwiching portion 3 with respect to the swelling portion 21 is formed in an inner peripheral side facing the other inclined surface 21a of the swelling portion 21 of the thin wall stainless steel pipe 2. The first retention portion 43 has an opposed surface 43a which comes into contact with the fitting inner peripheral surface 41 and is opposed to the sandwiching portion 3, and an inner peripheral surface 43b which is tilted in such a manner that a bore diameter becomes smaller to an end portion of the joint spacer 4, and the first retention portion 43 can press the first gasket 7 to the other inclined surface 21a of the swelling portion 21 by the opposed surface 43a and the inner peripheral surface 43b. Further, a gasket receiving portion 44 is formed in an outer peripheral side of the first retention portion 43 of the joint spacer 4. Further, the joint spacer 4 is provided with a contact surface 45 which comes into contact with the inner end surface 32 of the sandwiching portion 3.

The joint 5 is fitted to an outer periphery of the fitting portion 42 of the joint spacer 4, and has a fitting inner peripheral surface 51 which engages with an end portion 42a of the fitting portion 42. Further, in the joint 5, an annular second retention portion 52 which sandwiches and presses the second gasket 8 is formed in a side facing the gasket receiving portion 44 of the joint spacer 4. The second retention portion 52 has an opposed surface 52a which comes into contact with the fitting inner peripheral surface 51 and is opposed to the sandwiching portion 3, and an inner peripheral surface 52b which is tilted in such a manner that a bore diameter becomes smaller toward the end portion of the joint 5, and the second retention portion 52 can press the second gasket 8 to the gasket receiving portion 44 by the opposed surface 52a and the inner peripheral surface 52b. Further, in the joint 5, a contact surface 53 coming into contact with the inner end surface 32 of the sandwiching portion 3, and a leading end inner peripheral surface 54 coming into contact with the leading end outer peripheral surface 46 of the joint spacer 4 are formed in the leading end close to the sandwiching portion 3. Further, the joint 5 is provided with a flange portion 55 which is opposed to the flange portion 35 of the sandwiching portion 3, and is constructed by a front flange portion 55a and a rear flange portion 55b, in an outer peripheral side of the leading end inner peripheral surface 54. The front flange portion 55a is provided in the sandwiching portion 3 side, and a bolt insertion hole 56 passes through the center thereof. The rear flange portion 55b is provided in a side opposite to the sandwiching portion 3, and a bolt insertion hole 57 that is an open long hole connecting from the above to the center is formed.

The flange portion 35 of the sandwiching portion 3, and the flange portion 55 of the joint 5 are fastened and coupled by a bolt 6 inserted to the bolt insertion holes 34, 56 and 57 and a nut 9. Accordingly, the inclined pressing surface 31 of the sandwiching portion 3 presses the inclined surface 21b of the swelling portion 21 of the thin wall stainless steel pipe 2 to the end portion side of the thin wall stainless steel pipe 2. On the other hand, with the inclined surface 21b being pressed, the first gasket 7 is pressed to the other inclined surface 21a of the swelling portion 21 of the thin wall stainless steel pipe 2, and the first gasket 7 is closely attached and sandwiched between the inclined surface 21a and an inner surface of the first retention portion 43 of the joint spacer 4.

Further, the flange portion 35 of the sandwiching portion 3, and the flange portion 55 of the joint 5 which are described above are fastened and coupled by the bolt 6 and the nut 9, the end portion 42a of the fitting portion 42 of the joint spacer 4 is engaged with the fitting inner peripheral surface 51 of the joint 5. Since the end portion 42a of the fitting portion 42 is engaged with the fitting inner peripheral surface 51 and the joint spacer 4 is pressed into the joint 5, the second gasket 8 is pressed by the gasket receiving portion 44 of the joint spacer 4, and the second gasket 8 is closely attached and sandwiched between the gasket receiving portion 44 and the inner surface of the second retention portion 52 of the joint 5. Since both the first gasket 7 and the second gasket 8 are closely attached and sandwiched as mentioned above, the thin wall stainless steel pipe 2 and the joint spacer 4 are connected in a state of having airtightness.

Figure 3:
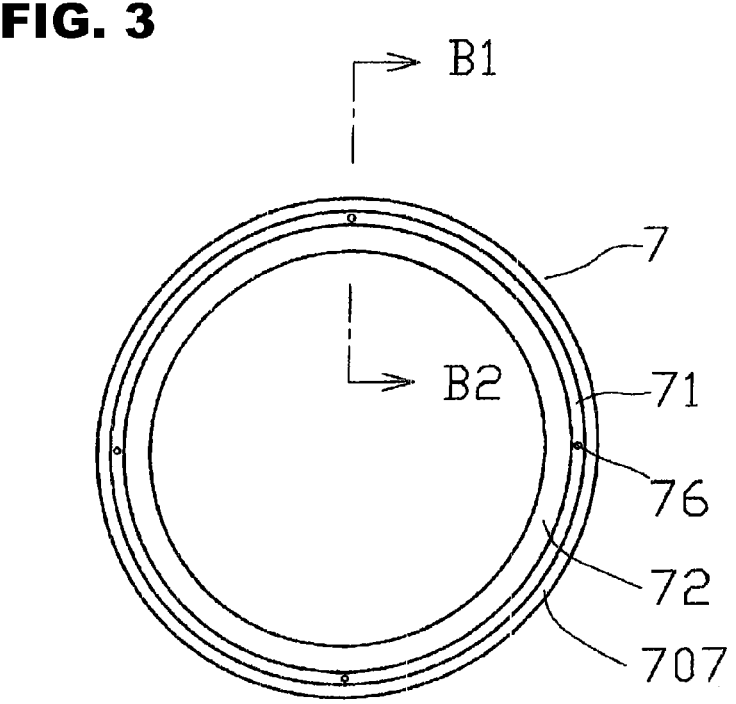
FIG. 3 is a front view of a first gasket.
Figure 4:
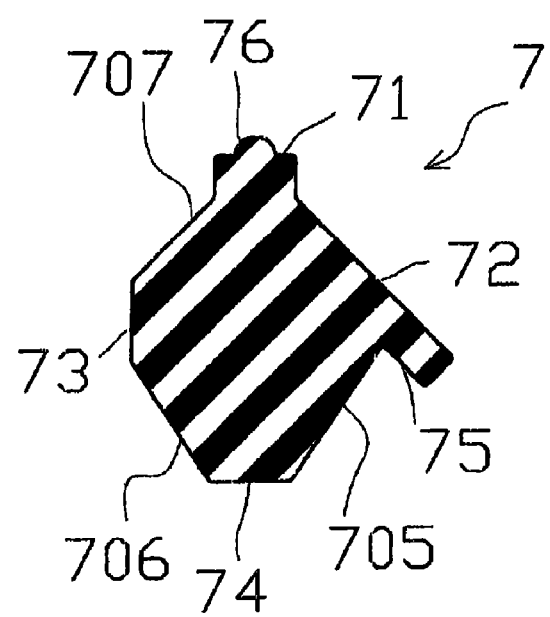
FIG. 4 is a cross sectional view showing a cross sectional shape of a surface along line B1-B2 in FIG. 3.

In this case, the first gasket 7 is constructed by an elastic material such as rubber or the like, is formed in an annular shape as shown in FIG. 3, and has an approximately heptahedral cross sectional shape as shown in FIG. 4. In the case of constructing the connection structure 1, a first surface 71 formed so as to protrude out of one corner on the approximately heptahedral shape is a surface which is opposed to the protruding portion 33 of the sandwiching portion 3 shown in FIG. 2. Similarly, a second surface 72 is a surface which comes into contact with the inclined surface 21a of the swelling portion 21 of the thin wall stainless steel pipe 2, and a third surface 73 and a fourth surface 74 are surfaces which come into contact with an inner surface constructing the first retention portion 43 of the joint spacer 4. In this case, the second surface 72 has a protruding portion 75 protruding to the fourth surface 74 side. The protruding portion 75 is a portion which is closely attached to the inclined surface 21a shown in FIG. 2, by a biasing force based on a spring property of the elastic material constructing the first gasket 7, and is provided for making the close attachment between the second surface 72 and the inclined surface 21a more secure. A fifth surface 705 between the second surface 72 and the fourth surface 74, a sixth surface 706 between the third surface 73 and the fourth surface 74, and a seventh surface 707 between the first surface 71 and the third surface 73 are contracted so as to be positioned in an air gap portion when the first gasket 7 is compressed, or are closely attached to any surface.

As mentioned above, the first gasket 7 is defined its other sides to come into contact, when the second surface 72, the third surface 73 and the fourth surface 74 construct the connection structure 1, thereby securing the reservation of the airtightness at the time of connecting the thin wall stainless steel pipe 2 and the joint spacer 4. Accordingly, in the case of being erroneously arranged in the first retention portion 43 with its front and back reversed, the airtightness between the thin wall stainless steel pipe 2 and the joint 5 may be deteriorated.

Accordingly, in order to be capable of discriminating the front and back even in a dark place of a construction site or the like, a projection 76 is provided in the first surface 71. Therefore, the front and back of the first gasket 7 can be easily identified in accordance with a visual sense and a tactile sense of a worker. The same effect can be obtained even by providing a depression (not shown) in the first surface 71 in place of the projection 76. Further, the number of the projection 76 or the depression provided in the first surface 71 may be one or more by which the worker can easily identify the front and back.

It should be noted that the first surface 71 is a surface which does not contribute to the reservation of the airtightness between the thin wall stainless steel pipe 2 and the joint 5. Accordingly, the provision of the projection 76 or the depression in the first surface 71 does not affect the reservation of the airtightness between the thin wall stainless steel pipe 2 and the joint 5.

Further, the second gasket 8 is constructed in the same manner except for a point that a diameter thereof is different from the first gasket 7. A first surface of the second gasket 8 is a surface which is opposed to the sandwiching portion 3 shown in FIG. 2, is provided with a projection or a depression for making it possible to discriminate its front and back, and is a surface which does not contribute to the reservation of the airtightness between the thin wall stainless steel pipe 2 and the joint 5. A second surface of the second gasket 8 is a surface which comes into contact with the gasket receiving portion 44 of the joint spacer 4, and a third surface and a fourth surface of the second gasket 8 are surfaces which come into contact with the inner surface constructing the second retention portion 52 of the joint 5. Further, a protruding portion protruding to the fourth surface side and included in the second surface of the second gasket 8 is a portion which is closely attached to the gasket receiving portion 44 shown in FIG. 2, by a biasing force based on the spring property of the elastic material constructing the second gasket 8, and makes the close attachment between the second surface and the gasket receiving portion 44 more secure. A fifth surface between the second surface and the fourth surface, a sixth surface between the third surface and the fourth surface, and a seventh surface between the first surface and the third surface are contracted so as to be positioned in an air gap portion when the second gasket 8 is compressed, or are closely attached to any surface.

In this case, in the work in the site, the sandwiching portion 3 is externally fitted to the end portion of the thin wall stainless steel pipe 2 by inserting the thin wall stainless steel pipe 2 to the sandwiching portion 3. Further, after the second gasket 8 is fitted to the second retention portion 52 of the joint 5, the joint spacer 4 is inserted to the joint 5 in such a manner that the fitting portion 42 of the joint spacer 4 is fitted to the fitting inner peripheral surface 51 of the joint 5. Accordingly, the second gasket 8 comes to a state in which it is stored between the second retention portion 52 of the joint 5 and the gasket receiving portion 44 of the joint spacer 4. Thereafter, the first gasket 7 is fitted to the first retention portion 43 of the joint spacer 4, and then the end portion of the thin wall stainless steel pipe 2 is inserted to the fitting inner peripheral surface 41 of the joint spacer 4. Therefore, it comes to a state where the flange portion 35 of the sandwiching portion 3 and the flange portion 55 of the joint 5 are opposed to each other, and the first gasket 7 and the protruding portion 33 of the sandwiching portion 3 are stored between the first retention portion 43 of the joint spacer 4 and the swelling portion 21 of the thin wall stainless steel pipe 2. Further, the contact surface 45 of the joint spacer 4 and the contact surface 53 of the joint 5 come to a state in which they are opposed to the inner end surface 32 of the sandwiching portion 3.

Further, as shown in FIG. 1, a bolt head 61 of the bolt 6 is structured so as to be positioned in the flange portion 55 side of the joint 5. Specifically, as shown in FIG. 5A, the bolt 6 is inserted to the center from above the bolt insertion hole 57 of the rear flange portion 55b in a state in which a shaft portion 62 is tilted downward (an arrow i). Next, as shown in FIG. 5B, a direction of a leading end of the shaft portion 62 of the bolt 6 is changed in such a manner as to be opposed to the bolt insertion hole 56 of the front flange portion 55a (an arrow ii). In this state, as shown in FIG. 5C, the bolt head 61 is moved until it comes into contact with an opposite surface to the flange portion 35 of the sandwiching portion 3 in the rear flange portion 55b (an arrow iii). Accordingly, since the shaft portion 62 of the bolt 6 is inserted to the bolt insertion holes 56 and 57, and the bolt insertion hole 34 provided in the flange portion 35 of the sandwiching portion 3, and the leading end thereof protrudes out of the bolt insertion hole 34, the shaft portion 62 is fastened and fixed by the nut 9.

Figure 7:
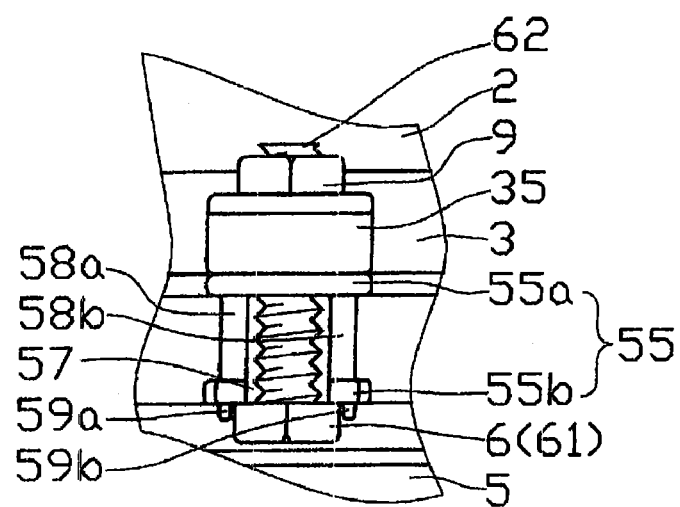
FIG. 7 is an explanatory view of the connection structure as seen from a direction C in FIG. 6.

In this case, as shown in FIG. 7, guide portions 58a and 58b are provided between the front flange portion 55a and the rear flange portion 55b. These guide portions 58a and 58b are used as a guide at the time of moving the bolt 6 for inserting the shaft portion 62 of the bolt 6 to the bolt insertion hole 56 or the like, and contribute to an improvement of a working property of the insertion.

Figure 5:
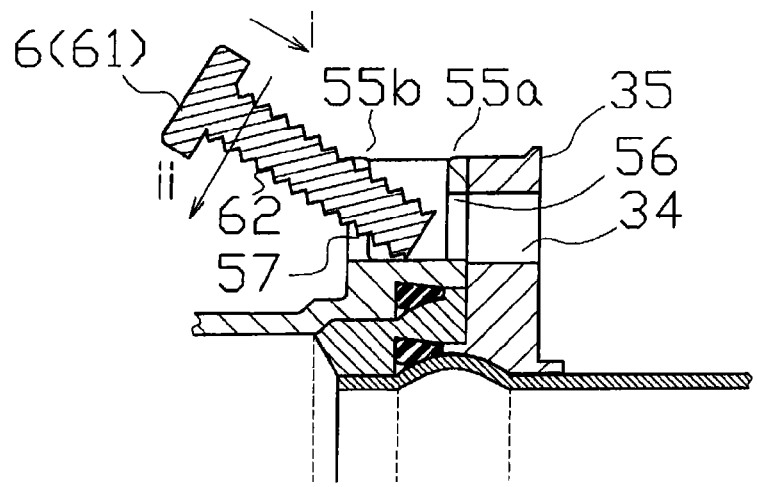
FIGS. 5(a), (b) and (c) are explanatory views showing an attaching procedure of a bolt.
Figure 5:
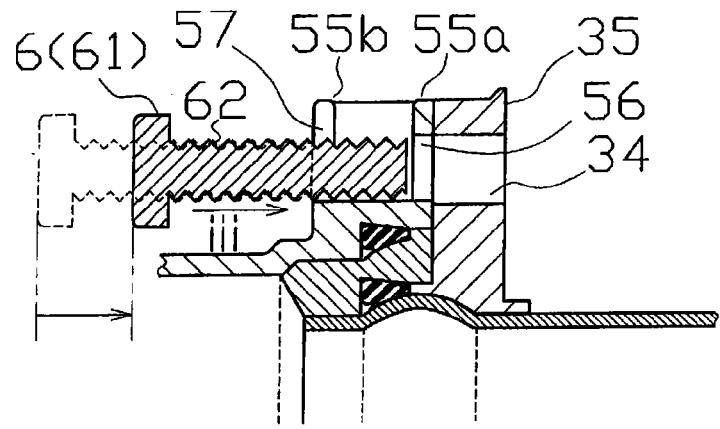
Figure 5:
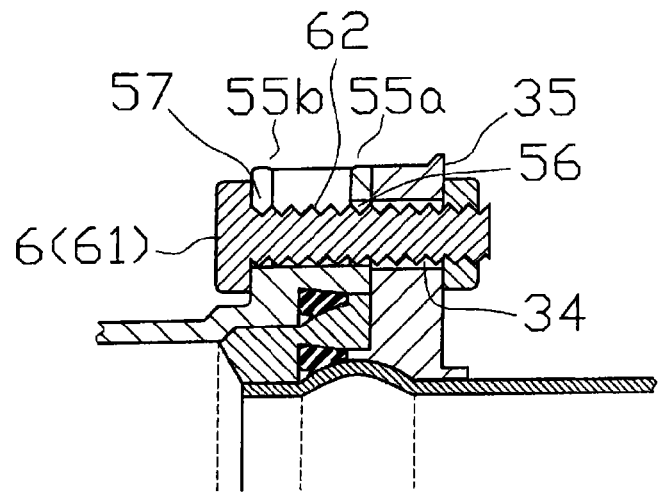

In the connection structure 1, the bolt 6 can be inserted as mentioned above. On the other hand, since it is necessary to carry out the insertion of the bolt 6 in the conventional general connection structure by pressing the shaft portion 62 of the bolt 6 to the flange portion 55 in a horizontally set state, as shown in FIG. 5B, a great space is necessary even in a place having a narrow branch portion. However, in the connection structure 1 according to the present invention, it is possible to reduce the space necessary for the inserting work of the bolt 6 at a space saving degree shown in FIG. 5 as compared with the conventional general connection structure. Accordingly, in the present connection structure 1, it is possible to easily insert the bolt 6 even in an inner peripheral side of the branch portion in the case where the joint 5 is constructed as a tee joint as shown in FIG. 1.

Figure 6:
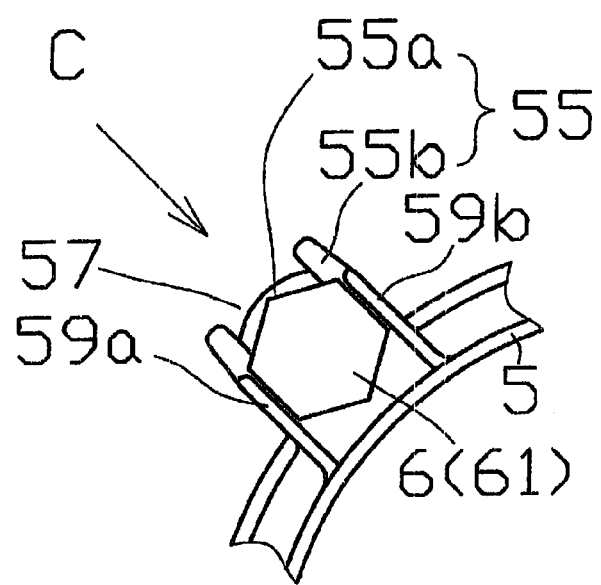
FIG. 6 is an explanatory view of the connection structure as seen from a direction A in FIG. 1.

In this case, rotation preventing devices 59a and 59b constructed by two parallel projections are provided in a surface opposite to the sandwiching portion 3 of the rear flange portion 55b, as shown in FIGS. 6 and 7. The rotation preventing devices 59a and 59b are structured such that two opposed surfaces in an outer periphery of the hexagonal bolt head 61 of the bolt 6 can come into contact with them so as to be fitted, at the time of arranging the bolt 6. Therefore, the rotation of the bolt 6 is regulated even if the bolt 6 tends to rotate under the state mentioned above. Accordingly, in the present connection structure 1, it is unnecessary to regulate the rotation of the bolt 6 by a tool or the like in the narrow inner peripheral side at the time of attaching the nut 9, and the working property is further improved.

The connection structure 1 described above can connect the joint 5 which complies with a thin wall stainless steel pipe 102, and the thin wall stainless steel pipe 2 which has a narrower pipe diameter than that of the thin wall stainless steel pipe 102 and does not comply with the joint 5, while having airtightness, by using the joint spacer 4 or the like. Further, since the fitting portion 42 of the joint spacer 4 is fitted to the fitting inner peripheral surface 51 of the joint 5, and the outer periphery of the end portion of the thin wall stainless steel pipe 2 is fitted to the fitting inner peripheral surface 41 of the joint spacer 4, respectively, it is possible to firmly connect the thin wall stainless steel pipe 2 and the joint spacer 4.

Accordingly, with the application of the present connection structure 1, it is possible to connect the thin wall stainless steel pipe 2 and the thin wall stainless steel pipe 102 in which the pipe diameters are different from each other, while having the airtightness, by using the general purpose joint 5. In other words, in the case where the present connection structure 1 is applied, it is not necessary to prepare a special joint provided with the plural kinds of end portions for complying with the pipe diameters of the respective thin wall stainless steel pipes. Therefore, the burden of the manufacturer supplying the joint, and the consumer using the joint can be widely reduced as compared with the case where the related art requiring the preparation of the special joint is applied.

Further, in the connection structure 1, the protruding portion 33 of the sandwiching portion 3 is structured such as to be inserted into the first retention portion 43 of the joint spacer 4 which is arranged within the joint 5. Accordingly, the sandwiching portion 3 and the joint 5 are positioned before the flange portion 35 of the sandwiching portion 3 and the flange portion 55 of the joint 5 are fastened and coupled by the bolt 6 and the nut 9. Therefore, the fastening and coupling work can be easily carried out. Further, in the connection structure 1, the first retention portion 43 is constructed by the opposed surface 43a which is opposed to the sandwiching portion 3, and the inner peripheral surface 43b which is tilted in such a manner that the bore diameter becomes smaller toward the end portion of the joint spacer 4, and the second retention portion 52 is constructed by the opposed surface 52a which is opposed to the sandwiching portion 3, and the inner peripheral surface 52b which is tilted in such a manner that the bore diameter becomes smaller toward the end portion of the joint 5, respectively. Since the first gasket 7 and the second gasket 8 are arranged respectively within the first retention portion 43 and the second retention portion 52, and are then closely attached respectively to the inner peripheral surfaces 43b and 52b by elasticity which tends to expand in an outer peripheral direction, the first gasket 7 and the second gasket 8 are prevented from being detached from the first retention portion 43 and the second retention portion 52 during work, respectively. Further, in the connection structure 1, as described above, a worker can easily identify the front and back of the first gasket 7 and the second gasket 8 by providing the projection or the like in the first surfaces of the first gasket 7 and the second gasket 8. Further, there is obtained such a feature that it is possible to arrange the bolt 6 in a smaller space as compared with the related art, by constructing the flange portion 55 of the joint 5 by the front flange portion 55a and the rear flange portion 55b, and providing in the rear flange portion 55b the bolt insertion hole 57 which is open to the center from above. Such a feature of the connection structure 1 contributes to an improvement of the working property of the connection between the thin wall stainless steel pipe 2 and the joint 5 at the site.

The connection structure 1 shown in the present embodiment is only one aspect of the connection structure between the thin wall stainless steel pipe and the joint according to the present invention, and can be executed in a variously modified manner within a range which does not deviate from the scope of the present invention.

In this embodiment, in FIG. 1, the joint 5 is shown as the tee joint, however, the shape of the joint 5 is not limited thereto. The connection structure 1 can be applied even in the case of using the other shaped joint 5 such as a linear joint, an elbow joint, a cross joint or the like.

The connection structure between the thin wall stainless steel pipe and the joint according to the present invention can be applied to the connection structure connecting the thin wall stainless steel pipe and the joint.

DESCRIPTION OF REFERENCE NUMERALS

1 CONNECTION STRUCTURE
2 THIN WALL STAINLESS STEEL PIPE
3 SANDWICHING PORTION
4 JOINT SPACER
5 JOINT
6 BOLT
7 FIRST GASKET
8 SECOND GASKET
21 SWELLING PORTION
32 INCLINED PRESSING SURFACE
43 FIRST RETENTION PORTION
44 GASKET RECEIVING PORTION
52 SECOND RETENTION PORTION

The invention claimed is:

1. A connection structure comprising:
a thin wall stainless steel pipe in which a swelling portion having two inclined surfaces is formed in an outer periphery of an end portion;
a sandwiching portion having a protruding portion protruding to an inner peripheral side of an inner end surface as well as forming an inclined pressing surface capable of pressing one inclined surface of the swelling portion of the thin wall stainless steel pipe to an end portion side in the inner peripheral side, having a flange portion in an outer peripheral side, and externally fitting to the thin wall stainless steel pipe;
a joint spacer forming a first retention portion pinching a first gasket and the protruding portion with respect to the swelling portion in an inner peripheral side facing the other inclined surface of the swelling portion as well as having a fitting portion forming a fitting inner peripheral surface fitted to the outer periphery of the end portion of the thin wall stainless steel pipe forming a gasket receiving portion in an outer peripheral side provided with the first retention portion, and further provided with a contact surface coming into contact with the inner end surface of the sandwiching portion;
a joint having a first retention portion sandwiching and pressing a second gasket to an inner peripheral side facing the gasket receiving portion as well as fitting to an outer periphery of the fitting portion of the joint spacer and having a fitting inner peripheral surface engaging with an end portion of the fitting portion, further having a contact surface coming into contact with the inner end surface of the sandwiching portion and a leading end inner peripheral surface coming into contact with a leading end outer peripheral surface of the joint spacer in a leading end close to the sandwiching portion, and further provided with a flange portion opposed to the flange portion of the sandwiching portion in an outer peripheral side thereof; and
a bolt fastening and coupling the flange portion of the sandwiching portion and the flange portion of the joint.

2. The connection structure according to claim 1, wherein the flange portion of the joint is constructed by a front flange portion having a bolt insertion hole at a center close to the sandwiching portion, and a rear flange portion having a bolt insertion hole which is an open insertion hole which is open from above the center thereof.

3. The connection structure according to claim 2, wherein a rotation preventing device of a bolt head of the bolt is provided in an end surface in a side opposite to the sandwiching portion of the rear flange portion.

* * * * *